United States Patent [19]

Nishimura

[11] Patent Number: 4,570,764
[45] Date of Patent: Feb. 18, 1986

[54] DAMPER APPARATUS IN CLUTCH FOR TORQUE CONVERTOR

[75] Inventor: Sadanori Nishimura, Omiya, Japan

[73] Assignee: Honda Giken Kogyo Kabushiki Kaisha, Tokyo, Japan

[21] Appl. No.: 516,362

[22] Filed: Jul. 22, 1983

[30] Foreign Application Priority Data

Jul. 24, 1982 [JP] Japan .................. 57-111614[U]

[51] Int. Cl.³ .................. F16H 45/02; F16D 33/12
[52] U.S. Cl. .................................. 192/3.29
[58] Field of Search ............... 192/3.28, 3.29, 3.3, 192/3.31, 3.32, 3.33

[56] References Cited

U.S. PATENT DOCUMENTS 3,966,031 6/1976 Peterson et al. .............. 192/3.3
4,333,552 6/1982 La Marche .................. 192/3.29
4,360,090 11/1982 Wonn ........................ 192/3.3

FOREIGN PATENT DOCUMENTS 2123906 2/1984 United Kingdom ........... 192/3.29

Primary Examiner—George H. Krizmanich
Attorney, Agent, or Firm—Armstrong, Nikaido, Marmelstein & Kubovcik

[57] ABSTRACT

A damper apparatus for a clutch for a torque convertor wherein an opening and closing member for opening and closing a communication hole through a clutch plate comprises a pressure regulating valve having a set pressure for opening and closing and a device for adjusting the set pressure in accordance with the amount of relative turning displacement between the clutch plate and a turbine blade wheel of the torque convertor. The torque convertor generally includes an input casing connected to an input shaft, a pump blade wheel, a turbine blade wheel interposed in an internal space between the pump blade wheel and the input casing, and a clutch plate interposed between the turbine blade wheel and the input casing. The turbine blade wheel is connected to an output shaft. The clutch plate is axially movable to be engaged with or disengaged from the input casing according to a difference in fluid pressures acting on both side surfaces thereof. The damper spring mechanism interconnects the clutch plate and the turbine blade wheel for relative turning therebetween.

2 Claims, 4 Drawing Figures

DAMPER APPARATUS IN CLUTCH FOR TORQUE CONVERTOR

BACKGROUND OF THE INVENTION

This invention relates to an improvement in a damper apparatus in a clutch for a torque convertor used chiefly for a transmission for a vehicle.

The applicant has previously proposed a damper apparatus in a clutch for a torque convertor. A turbine blade wheel connected to an output shaft is positioned in the internal space of a main body of a torque convertor surrounded by an input casing on one side connected to an input shaft and a pump blade wheel on the other side connected to the input casing. A clutch plate is interposed between the turbine blade wheel and the input casing. The clutch plate is arranged to be axially movable to be either engaged with or disengaged from the input casing according to a difference between fluid pressures acting on both side survaces thereof. The clutch plate and the turbine blade wheel are interconnected through a damper spring means to be relatively turnable. The clutch plate is provided with a communication hole for communicating between both side surfaces thereof and with an opening and closing member for opening and closing the communication hole, so that an opening area of the communcation hole may be adjusted by the opening and closing member in accordance with a relative turning displacement amount between the clutch plate and the turbine blade wheel. When the driving force is small and the amount of relative turning displacement is also small, the opening area of the communication hole is increased. The amount of leakage of the fluid through the communcation hole is increased, resulting in decreasing the pressure difference between the opposite side surfaces of the clutch plate. Thus, the engaging force of the clutch plate is weakened in accordance with a decrease in a driving torque. The clutch plate easily slips, and a torque change is absorbed by such slipping.

This apparatus, however, has the problem that even if the opening area of the communcation hole remains unchanged, the amount of leakage of the fluid varies with change of viscosity of the fluid caused by change of temperature. Accordingly, the difference in the pressures of the fluids between the both side surfaces of the clutch plate varies with a change in temperature. Consequently, the engaging force of the clutch plate at the time of a low temperature and at the time of a high temperature differs.

OBJECTS AND SUMMARY OF THE INVENTION

It is an object of the present invention to provide a damper apparatus in a clutch for a torque convertor wherein the engaging force of the clutch plate does not vary with the temperature of the fluid therein.

It is a further object of the present invention to provide a fairly simple construction for accomplishing the above object.

These and other objects are obtained in a damper apparatus for a clutch for a torque convertor with the torque convertor having certain structure. The torque convertor includes an input casing connected to a input shaft. A pump blade wheel is provided with the pump blade wheel and the input casing defining there between an internal space. A turbine blade wheel is provided in the internal space and is connected to an output shaft. A clutch plate is interposed between the turbine blade wheel and the input casing. The clutch plate is axially movable to be engaged with or disengaged from the input casing according to a difference in fluid pressures acting on both side surfaces thereof. A damper spring means interconnects the clutch plate and the turbine blade wheel to permit relative turning therebetween. The clutch plate has a communication hole therein for communicating between both side surfaces thereof and an opening and closing member for opening and closing the communication hole. The present invention is characterized in that the opening and closing member comprises a pressure regulating valve having a set pressure for opening and closing and means for adjusting the set pressure in accordance with an amount of relative turning displacement between the clutch plate and the turbine blade wheel.

The pressure regulating valve can include a valve housing fixed to an outer peripheral portion of the clutch plate, a valve body housed therein, and a pressure regulating spring in the housing urging the valve body in a closing direction. The valve body is urged in an opening direction by fluid pressure from the internal space of the torque convertor. The means for adjusting can include a plunger slidably mounted in the valve housing acting on the regulating spring and an operation member extending from the turbine blade wheel in abutment with the plunger.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
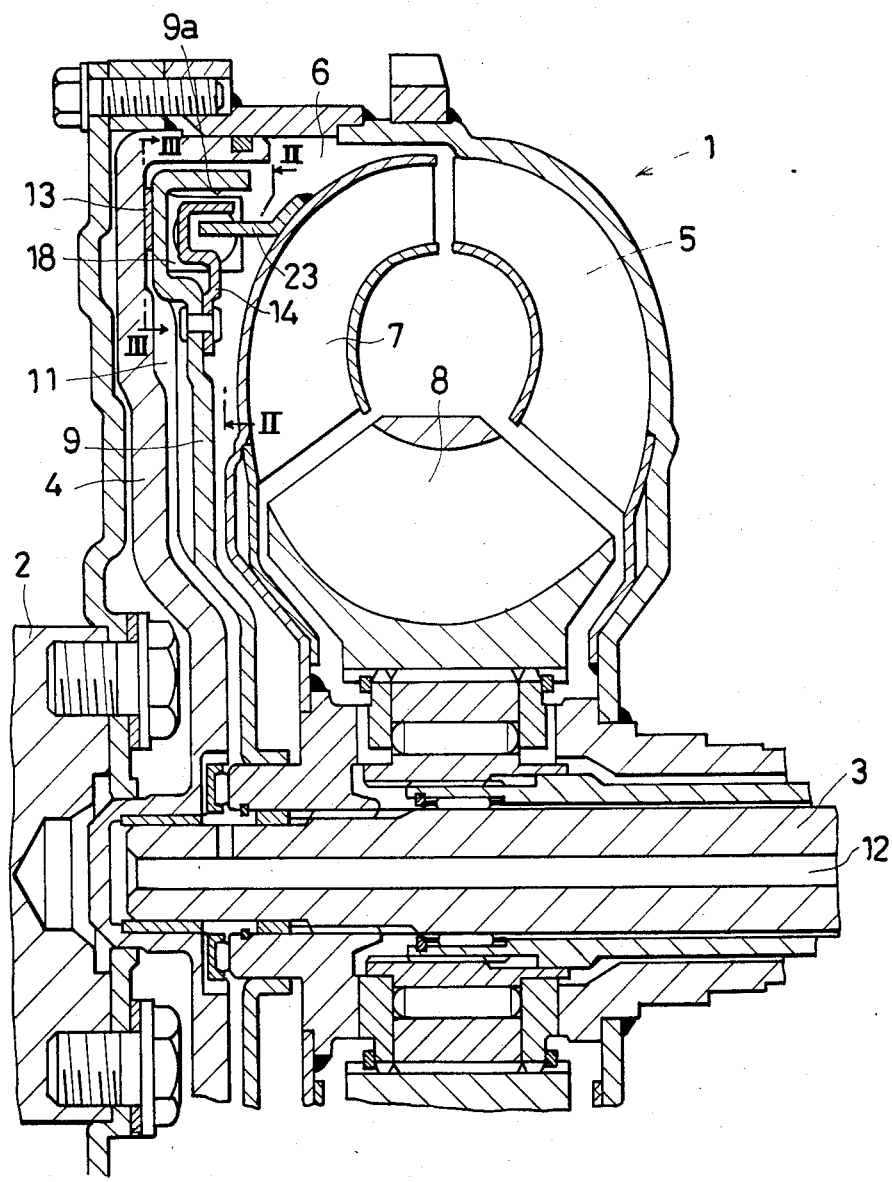
FIG. 1 is a sectional side view of on embodiment of this invention.

One embodying example of this invention will be explained with reference to the accompanying drawings:

Referring to the drawings, a main body 1 of a torque convertor has an input shaft 2 connected to an internal combustion engine and an output shaft 3 connected to a load such as a driving wheel of a vehicle of the like. The shafts 2 and 3 are disposed front and rear along their common single axis line. The main body 1 is provided with a front side input casing 4 on a front side connected to the input shaft 2 and a pump blade wheel 5 on a rear side connected to the input casing 4. The internal space 6 surrounded by the input casing 4 and the pump blade wheel 5 is provided with a turbine blade wheel 7 connected to the output shaft 3 and a stator blade wheel 8 interposed between the turbine blade wheel 7 and the pump blade wheel 5. When the input shaft 2 is turned, an internal fluid is circulated through these blade wheels 5,7,8 and fluid torque is transmitted to the output shaft 3. A clutch plate 9 is provided between the turbine blade wheel 17 and the input casing 4 and is axially movable to be either engaged with or disengaged from the input casing 4 in accordance with change of a difference between fluid pressures acting on front and rear side surfaces thereof. Additionally, the clutch plate 9 and the turbine blade wheel are interconnected through a damper spring means 10 as to be relatively turnable. When the clutch plate 9 is engaged with the input casing 4, a mechanical torque transmission occurs through a course of the input shaft 2 - the input casing 4 - the clutch plate 9 - the damper spring means 10 - the turbine blade wheel 7 - the output shaft 3.

Figure 2:
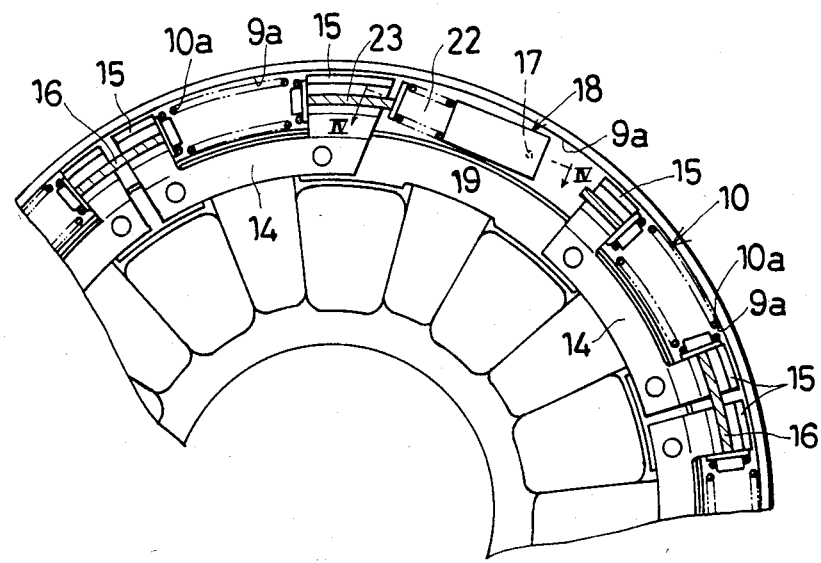
FIGS. 2 and 3 are sectional views taken along the lines II—II and III—III in FIG. 1.

More in detail, in the illustrated example, the clutch plate 9 is acted upon at its rear surface by a fluid pressure in the internal space 6 and at its front surface by fluid pressure in a gap 11 formed between the same and the input casing 4. The plate 9 is arranged so that, if the fluid pressure in the gap 11 is decreased by a fluid pressure control means (not illustrated) connected to the gap 11 through an axial opening passage 12 made in the output shaft 3, the plate 9 is caused to advance and is brought into frictional engagement, at a friction material 13 on the front surface of an outer peripheral portion thereof, with the input casing 4. As shown in FIG. 2, the damper spring means 10 comprises plural coil springs 10a disposed circumferentially at regular spaced intervals in an annular recess portion 9a made in the rear surface of the outer peripheral portion of the clutch plate 9. Each of plural supporting members 14 for each of the coil springs 10a for preventing the coil spring 10a from coming off inwards is fixed to the clutch plate 9. Each pair of input side retainers 15, 15 for holding each coil spring 10a therebetween are provided to protrude from both end portions of each supporting member 14. Each output side retainer 16 protruding forwards from the turbine blade wheel 7 is located in each of the spaced intervals between the coil springs 10a.

If it is now assumed that the drive turning direction by the engine, that is, the regular turning direction of the clutch plate 9 is counterclockwise in FIG. 2 at the time of transmission of the driving torque from the engine, the turbine blade wheel 7 is given a relative turning direction in relation to the clutch plate 9. On this occasion, each coil spring 10a is given through the output side retainer 15 a compression displacement thereof until there is developed a spring force corresponding to the driving torque. Thus, the amount of relative turning displacement of the turbine blade wheel 7 in the clockwise direction is increased according as the driving torque is increased.

When any torque change is generated, each coil spring 10a expands or contracts around its compressed displacement position corresponding to the driving torque and thus serves to absorb the torque change. In this case, the coil springs 10a are required to have a comparatively high spring constant. The spring constant must be high in order to eliminate the situation when, at a comparatively large driving torque, a torque change occurs after the coil spring is compressed to its maximum compression position under a steady condition. Additional torque increases cannot be absorbed by the coil spring. If, however, a coil spring 10a having such a high spring constant is used, a torque change at a comparatively small driving torque cannot be fully absorbed.

If, in this case, the clutch plate 9 is provided with a communication hole 17 for communicating between both the side surfaces thereof and, at a comparatively small driving torque region, the communication hole 17 is opened by an opening and closing member to permit the fluid to flow from the internal space 6 into the gap 11, reducing the difference between the liquid pressures on the opposite side surfaces of the clutch plate 9 to weaken the engaging force of the clutch plate 9, a torque change in a small driving torque region can be effectively absorbed by a slipping of the clutch plate 9.

According to this invention, the opening and closing member comprises a pressure regulating valve 18 having an adjustable set pressure. That is, means are provided for increasing and decreasing the set pressure of the valve 18 in accordance with the amount of relative turning displacement between the clutch plate 9 and the turbine blade wheel 7.

Figure 4:
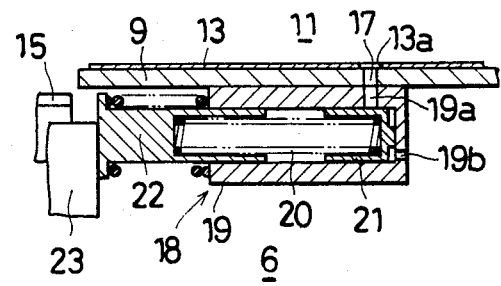
FIG. 4 is a sectional view taken along the line IV—IV in FIG. 2.

More in detail, in the illustrated example, the pressure regulating valve 18 includes, as shown clearly in FIG. 4, a valve housing 19 having an outlet port 19a connected to the communication hole 17 made in the outer peripheral portion of the clutch plate 9 and an inlet port 19b connected to the internal space 6. The housing 19 is fixedly provided in the recess portion 9a made in the outer periphery portion of the clutch plate 9. A pressure regulating valve body 21 which is urged by a pressure regulating spring 20 towards its closing side on the right-handed side of the same Figure and which is pushed towards its opening side on the left-handed side by the fluid pressure in the internal space 6 acting thereon through the inlet port 19b is housed in the valve housing 19. The pressure regulating spring 20 is arranged to be adjustable in its spring pressure by means including a plunger 22 acting on the left end thereof. The plunger 22 is arranged to be brought, at its left side surface, in abutment with an operation member 23 projecting from the turbine blade wheel 7.

Figure 3:
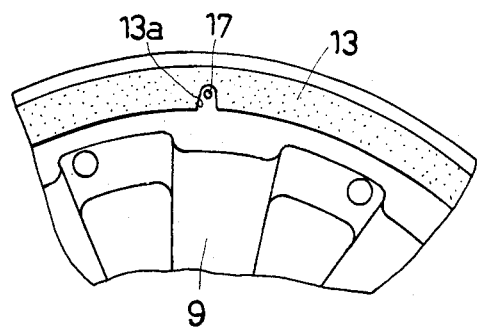

In this case, as shown in FIG. 3, the friction material 13 on the front surface of the outer peripheral portion of the clutch plate 9 has a cut-out portion 13a which is in alignment with the communication hole 17 so that the fluid from the communication hole 17 may flow into the gap 11 through the cut-out portion 13a.

Next, the operation of the apparatus will be explained as follows:

The pressure regulating valve 18 operates in such a manner that when the fluid pressure in the internal space 6 is higher than the predetermined set pressure determined by a spring pressure of the pressure regulating spring 20, the same is opened to cause fluid to leak out through the communication hole 17. Thus, the fluid pressure in the space 6 is automatically adjusted to become the set pressure. When, on this occasion, there is created the relative turning in the clockwise direction of the turbine blade wheel 7 in relation to the clutch plate 9, the plunger 22 is pushed by the operation member 23 toward the right in FIG. 4 to increase the spring pressure of the pressure regulating spring 20. Thus, after all, the set pressure is increased and decreased in accordance with the amount of relative turning displacement of the turbine blade wheel 7. The set pressure becomes small at a region which is small in a small torque change of driving force and small in amount of relative turning displacement. The fluid pressure difference between both the side surfaces of the clutch plate 9 is thereby decreased and the engaging force of the clutch plate 9 against the input case 4 is weakened according to a decrease in driving torque.

In this case, even when the temperature is changed, the fluid pressure in the internal space 6 is adjusted accurately to the set pressure of the pressure regulating valve 18. Thus pressure change is not caused by the temperature change. Accordingly change in engaging force of the clutch plate 9 is not caused by a temperature change.

Thus, according to this invention, the pressure acting on the clutch plate is controlled by the pressure regulating valve, so that pressure change caused by a temperature change is eliminated. Consequently, the engaging force of the clutch plate can be controlled accurately in accordance with only driving torque.

It is readily apparent that the above-described damper apparatus meets all of the objects mentioned above and also has the advantage of wide commercial utility. It should be understood that the specific form of the invention hereinabove described is intended to be representative only, as certain modification within the scope of these teachings will be apparent to those skilled in the art.

Accordingly, reference should be made to the following claims in determining the full scope of the invention.

What is claimed is:

1. A damper apparatus in a clutch for a torque convertor, the torque convertor including an input casing connected to an input shaft, a pump blade wheel, the pump blade wheel and the input casing defining therebetween an internal space, a turbine blade wheel in the internal space and connected to an output shaft, and a clutch plate interposed between the turbine blade wheel and the input casing, the clutch plate being axially movable to be engaged with or disengaged from the input casing according to a difference between fluid pressures acting on both side surfaces thereof; the damper spring means interconnecting the clutch plate and the turbine blade wheel for relative turning therebetween, the clutch plate having a communication hole therein for communicating between both side surfaces thereof, and an opening and closing member for opening and closing the communication hole; characterized in that the opening and closing member comprises a pressure regulating valve having a set pressure for opening and closing and means for adjusting the set pressure in accordance with an amount of relative turning displacement between the clutch plate and the turbine blade wheel.

2. The apparatus as set forth in claim 1, wherein the pressure regulating valve includes a valve housing fixed to an outer peripheral portion of the clutch plate, a valve body housed therein, the valve body being urged toward in opening direction by fluid pressure in said internal space, and a pressure regulating spring in the housing urging the valve body in a closing direction; and said means for adjusting includes a plunger slideably mounted in the valve housing acting on the pressure regulating spring, and an operation member extending from the turbine blade wheel in abutment with the plunger.

* * * * *